(12) United States Patent
De France

(10) Patent No.: US 7,039,988 B2
(45) Date of Patent: May 9, 2006

(54) SINGLE JAW WEDGE DEAD END

(75) Inventor: Robert De France, Poughkeepsie, NY (US)

(73) Assignee: Delri, LLC, Winsted, CT (US)

( * ) Notice: Subject to any disclaimer, the term of this patent is extended or adjusted under 35 U.S.C. 154(b) by 117 days.

(21) Appl. No.: 10/672,099

(22) Filed: Sep. 26, 2003

(65) Prior Publication Data

US 2005/0066482 A1    Mar. 31, 2005

(51) Int. Cl.
*F16G 11/00* (2006.01)
*H01R 4/52* (2006.01)

(52) U.S. Cl. .................. 24/136 R; 24/115 M; 439/783

(58) Field of Classification Search .............. 24/136 R, 24/115 R, 115 M; 403/374.2; 439/783, 439/796; 294/102.1
See application file for complete search history.

(56) References Cited

U.S. PATENT DOCUMENTS

| | | | | |
|---|---|---|---|---|
| 824,556 A | * | 6/1906 | Lowry et al. ............. | 24/136 R |
| 904,863 A | * | 11/1908 | Glass et al. ............... | 24/136 R |
| 1,080,472 A | * | 12/1913 | Parker et al. ............. | 24/136 R |
| 2,146,575 A | * | 2/1939 | Hefftner ................... | 24/136 R |
| 2,220,203 A | * | 11/1940 | Branin ...................... | 24/136 R |
| 4,050,761 A | | 9/1977 | De France | |
| D305,860 S | | 2/1990 | DeFrance | |
| 5,539,961 A | | 7/1996 | DeFrance | |
| 5,647,046 A | | 7/1997 | Cowen et al. | |
| 6,076,236 A | | 6/2000 | DeFrance | |
| 6,389,213 B1 | | 5/2002 | Quesnel | |

* cited by examiner

*Primary Examiner*—Robert J. Sandy
(74) *Attorney, Agent, or Firm*—Alix, Yale & Ristas, LLP

(57) ABSTRACT

A wedge dead end employs a single wedge-shaped jaw movable in an angled jaw guide between a rearward open position and a forward gripping position. The single jaw wedge dead end defines a fixed cable trough generally parallel to a lower gripping surface of the wedge-shaped jaw. When released from its rearward open position the jaw moves toward its forward gripping position and into a wedging engagement against a conductor disposed in the cable trough. Forward movement of the jaw applies gripping force against the conductor until the full tension of the transmission line is developed.

19 Claims, 7 Drawing Sheets

SINGLE JAW WEDGE DEAD END

BACKGROUND OF THE INVENTION

1. Field of the Invention

The invention relates to dead end connectors for gripping and securing wires, such as the electrical conductors of power lines, and for maintaining them in tension. More specifically, the invention relates to a dead end of the type that employs wedge-shaped jaws to grip the conductors.

2. Description of the Related Art

Dead ends are couplings used to anchor electrical transmission lines to supporting structures such as towers or poles. The dead end typically connects the power line to an insulated mount attached to the supporting structure. Dead ends to which the invention relates must include a mechanism for gripping the conductor of the power line so that the tension on the line is delivered through the insulated mount to the supporting structure. Dead ends are characterized by robust construction from high strength materials to withstand the tension on power line, which may exceed several thousand pounds of force. Weather events, such as wind and ice may place an additional strain on the dead end.

A critical factor in the effectiveness of a dead end is the mechanism used to grip and hold the conductor of the power line. Many prior art dead ends use clamps compressed together by nuts and bolts. The clamping force developed by such mechanisms depends on the degree to which the clamp components are compressed together by the hardware. As will be apparent, the effectiveness of hardware-clamped dead ends is impaired by variation in the torque applied to the hardware by different installers. Under-tightening of the hardware reduces the retaining strength of the assembly, while over-tightening is known to cause stress related failure of dead end components.

U.S. Pat. Nos. 5,539,961 and 6,076,236 illustrate dead ends that improve over the hardware-clamped dead end by employing a pair of spring loaded wedge-shaped jaws to grip the conductor of a power line. The jaws travel in converging guides toward a gripping position in which they are wedged against the conductor. The dead ends include a latch for maintaining the jaws in an open position against the spring bias. Transverse teeth on the jaw inside faces bite into the conductor when the jaws are in the gripping position. Gripping force in the disclosed wedge dead ends is proportional to the tension on the power line. The steps of tightening bolts and the associated variability are eliminated. The wedge dead ends simplify installation and increase the consistency of the connection between the dead end and the power line.

While the above-described wedge dead ends have proven successful, further improvements in dead end design are possible. For example, the prior art wedge dead ends have many moving parts, which make them expensive to manufacture. The two movable, spring-loaded jaws of the prior art wedge dead ends are coupled for simultaneous movement. Because the jaws are coupled, any jarring or movement applied to one jaw is delivered to the other jaw and the latch mechanism. Frequently, the latch is prematurely triggered by attempts to arrange a stiff power line conductor between the jaws. The jaws must then be re-set to the open and latched position and the process repeated. Dead end installation is carried out on the tower or other support structure, making repetition of steps awkward, time consuming and dangerous.

There is a need in the art for a more cost effective and easy to use wedge dead end.

SUMMARY OF THE INVENTION

With the preceding background in mind, an object of the present invention is to provide a new and improved dead end for electrical transmission lines which improves over the above discussed two jaw wedge dead ends by employing a single wedge-shaped sliding jaw. The jaw travels in a jaw guide arranged at an angle relative to a fixed cable trough defined by a gripper body portion of the dead end. The jaw is spring biased toward a forward gripping position where it comes into a wedging engagement against a conductor disposed in the cable trough. The wedge dead end includes a latch for retaining the jaw in a rearward open position against the spring bias. Placement of a cable conductor in the cable trough does not involve contact with any moving parts connected to the jaw or latch and therefore is unlikely to transmit movement to the latched jaw causing an unintended jaw release.

The disclosed single jaw wedge dead end provides a robust and secure retention of a cable conductor with substantially fewer parts and enhanced ease of operation relative to the above discussed prior art wedge dead ends.

BRIEF DESCRIPTION OF THE DRAWINGS

The present single jaw wedge dead end will now be described in more complete detail with frequent reference being made to the several drawing figures, which may be identified as follows.

DETAILED DESCRIPTION OF THE PREFERRED EMBODIMENT

Figure 1:
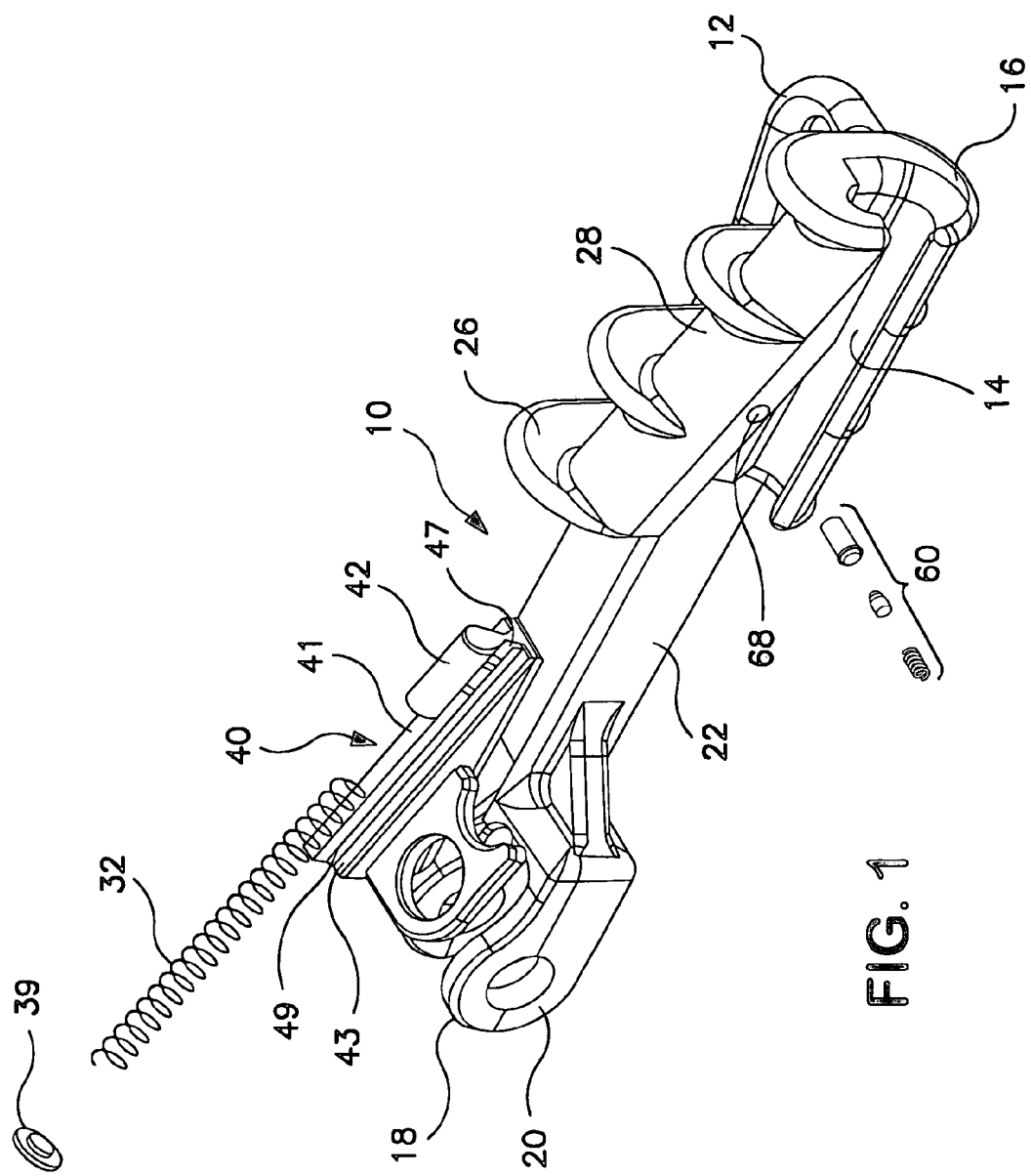
FIG. 1 is an exploded pre-assembly view illustrating the components of an exemplary single jaw wedge dead end illustrative of aspects of the present invention.

FIGS. 1–7 illustrate an exemplary embodiment 10 of a single jaw wedge dead end according to aspects of the present invention. The single jaw wedge dead end 10 extends from a first end 18 to a second end 16. The first end 18 includes a clevis-type coupling 20 integrally extending from a single leg 22. The single leg 22 is offset relative to the clevis 20 and includes a longitudinally extending strengthening rib 21. A gripper body 28 extends from the end of the leg 22 opposite the clevis 20. The gripper body 28 defines a cable trough 14 open at opposed longitudinal ends and along one side. The gripper body 28 is reinforced with laterally projecting webs 26 to provide structural strength without excessive weight. The gripper body 28 takes the form of a reverse C shape with converging upper and lower lips 27, 29 that define a cable entry slot.

Figure 4:
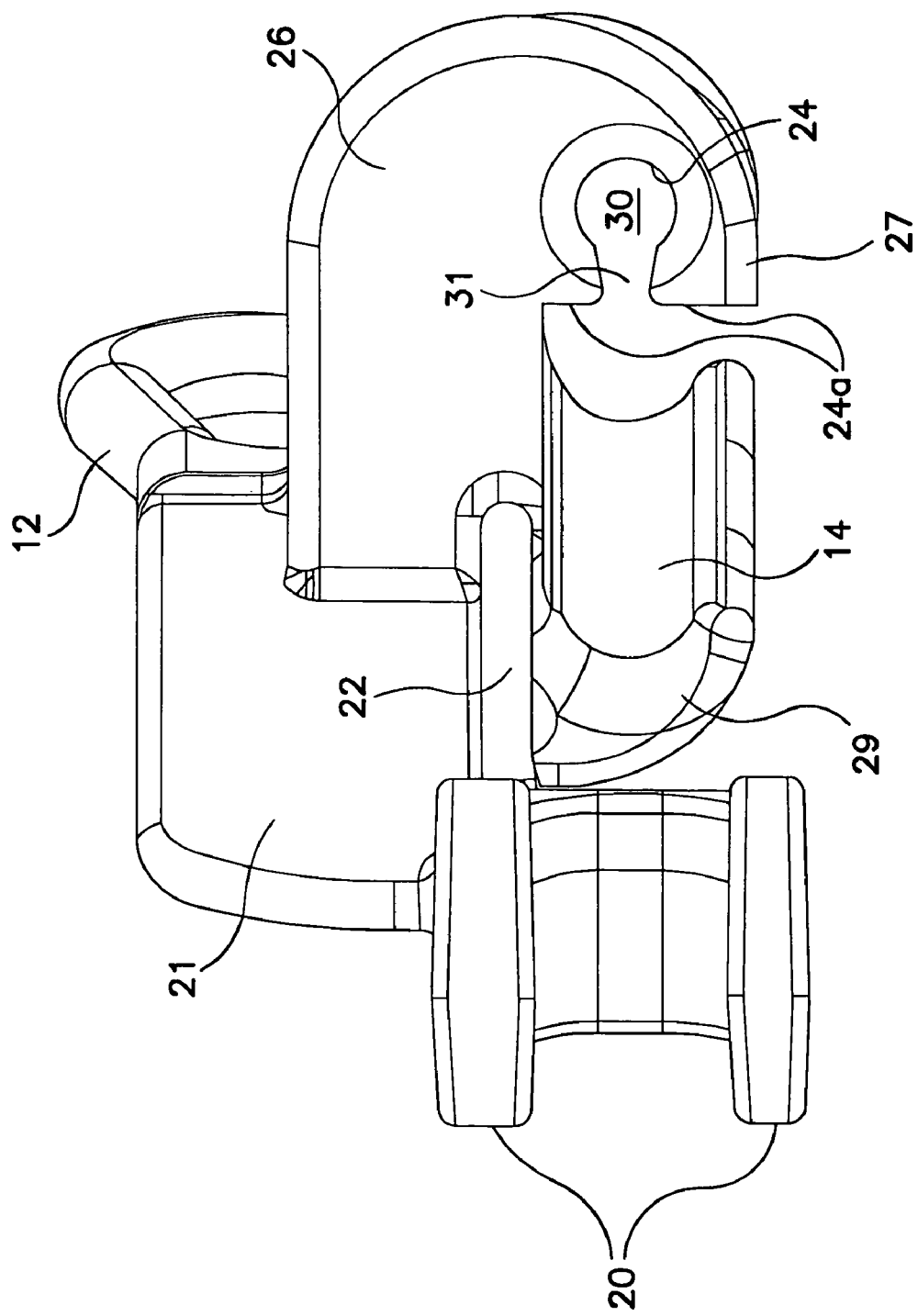
FIG. 4 is a rear perspective view of the wedge dead end of FIG. 1 with the jaw removed.

An upper part of the gripper body 28 defines a jaw guide 24 disposed at an angle α of approximately 15° relative to the cable trough 14. When viewed from the rear, gripper body 28 defines a distinctly keyhole-shaped jaw guide 24 with an upper enlarged part 30 and a narrow part 31 defining a slot for receiving jaw spine 41. A generally cylindrical enlarged part 30 of the jaw guide 24 communicates with the space above the cable trough 14 by a narrowed part 31 defined between lower surfaces 24a. The narrowed part 31 of the jaw guide 24 has a wedge configuration in section between walls that converge as they progress from the enlarged part 30 toward the cable trough 14 (FIG. 4). The generally cylindrical enlarged part 30 and wedge-shaped narrowed part 31 of the jaw guide 24 cooperate with a complementary shaped key 42 and spine 41 to permit sliding engagement of the jaw 40 in the jaw guide 24.

Figure 3:
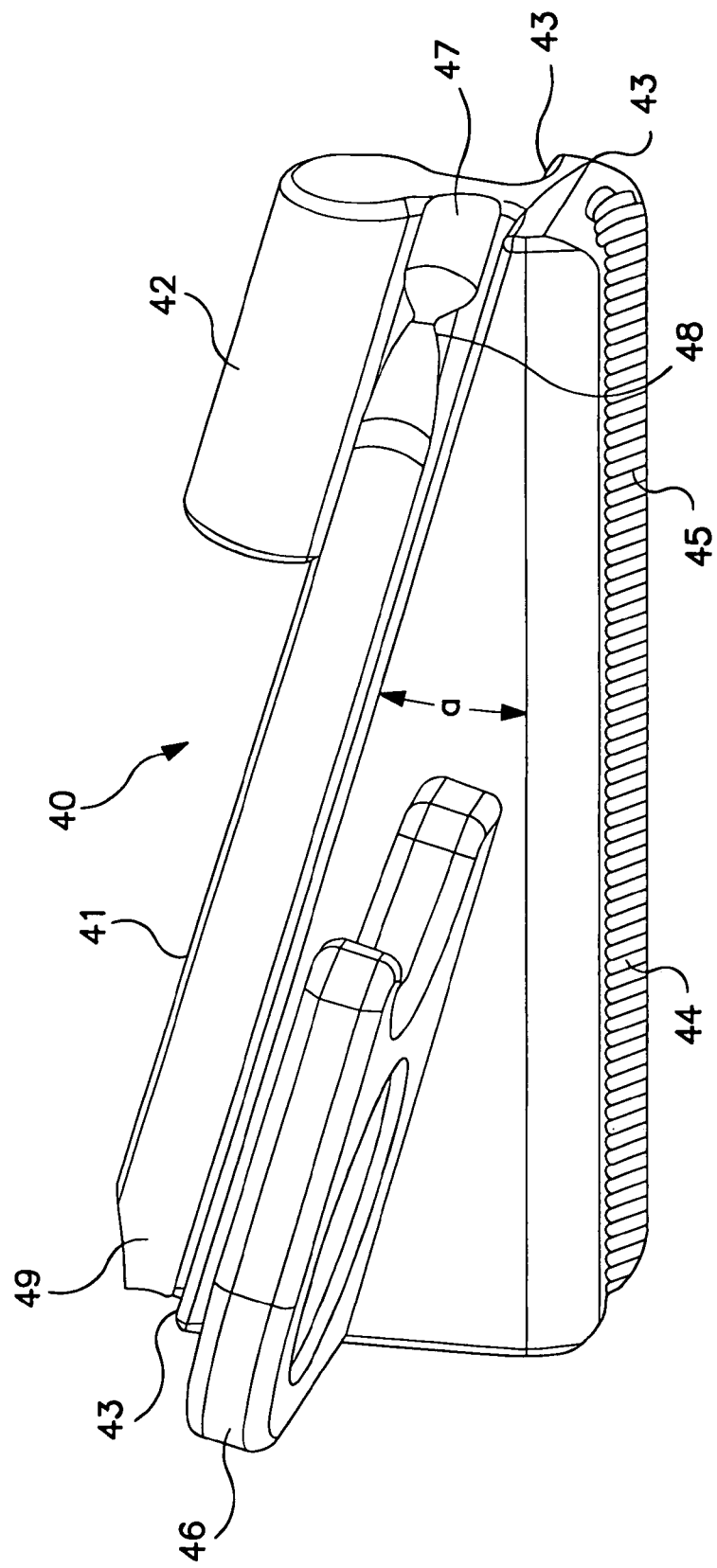
FIG. 3 is an enlarged side perspective view of a wedge-shaped jaw illustrative of aspects of the present invention.

The gripping mechanism includes one jaw 40, a biasing spring 32 and a cap 39, as shown in FIG. 1. With reference to FIG. 3, the jaw 40 is of a generally wedge-shaped configuration and includes a handle 46 for manipulating the jaw, a jaw key 42 and a lower cable gripping surface 44. The upper surface of the jaw at its forward end defines the jaw key 42. The jaw key 42 is configured to engage the keyhole shaped jaw guide 24 for longitudinal travel therein. Rearwardly of jaw key 42, the upper surface defines a longitudinally extending spine 41 that engages the narrow part 31 of the jaw guide 24 to maintain the jaw 40 in alignment with the gripper body 28. The jaw 40 is slidably retained in the gripper body by engagement of the jaw spine 41 and jaw key 42 in the keyhole-shaped jaw guide 24.

Figure 2:
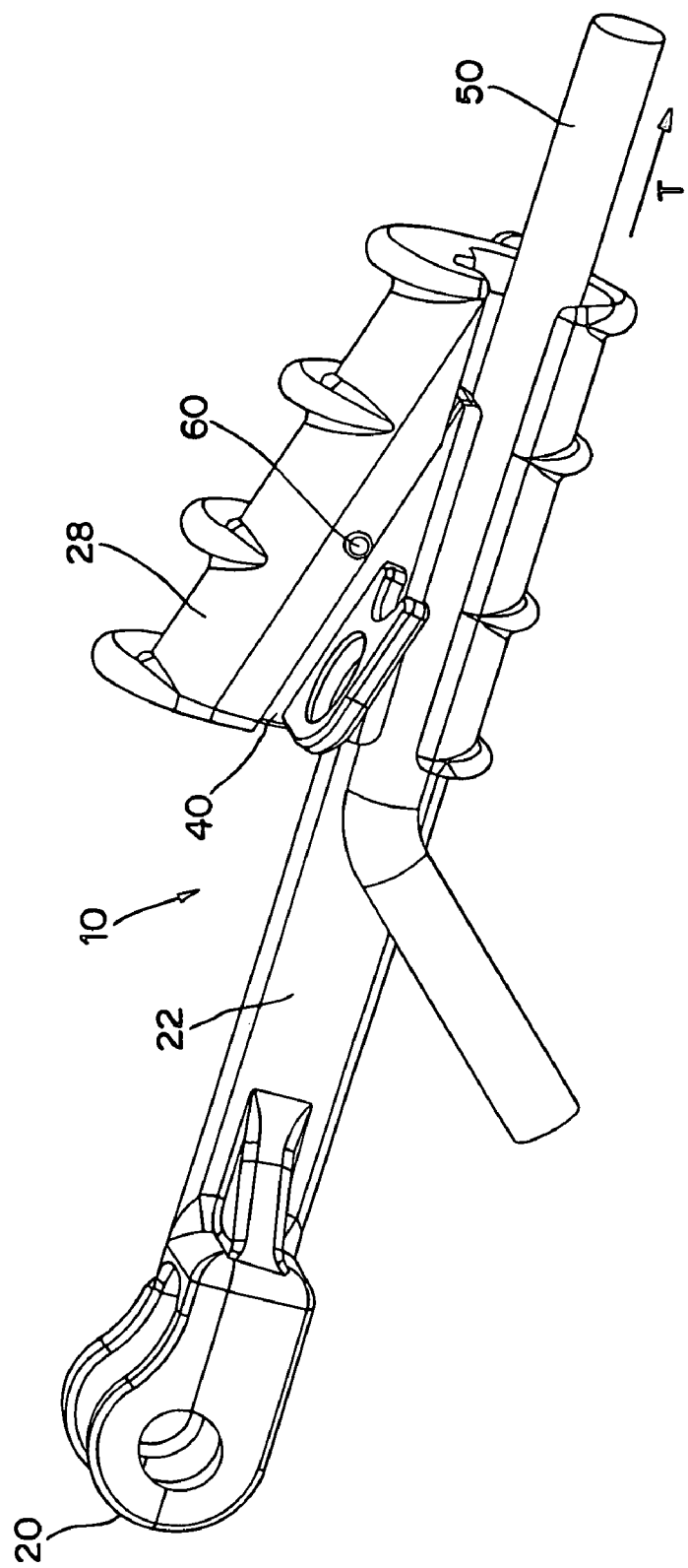
FIG. 2 is an assembled side view of the single jaw wedge dead end of FIG. 1 in conjunction with a conductor.
Figure 6:
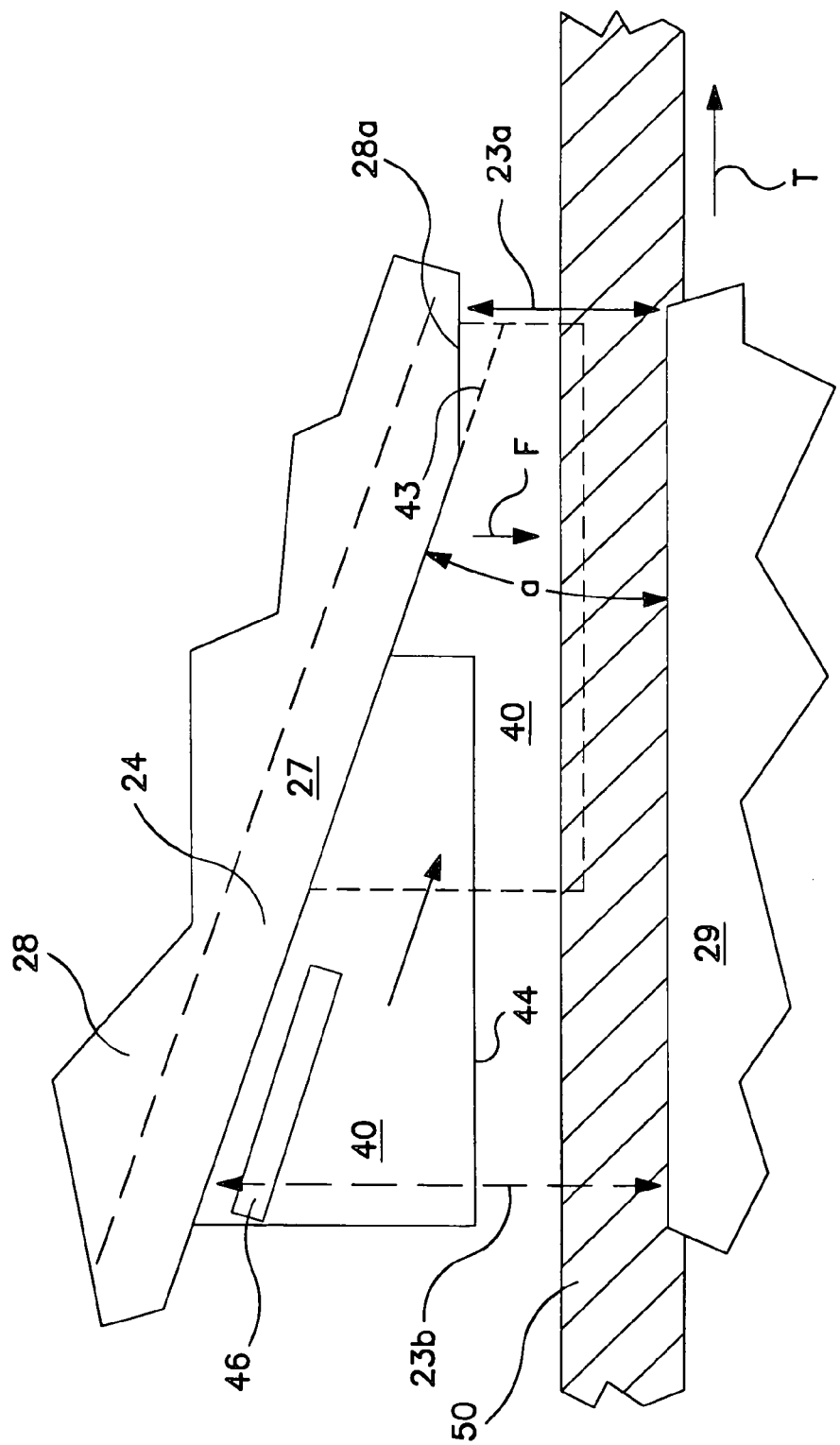
FIG. 6 is a side schematic view, partially broken away, illustrating the gripping mechanism of a representative single jaw wedge dead end in accordance with aspects of the present invention.

With reference to FIGS. 2, 3 and 6, the jaw defines longitudinal shoulders 43 on either side of the longitudinal spine 41. The shoulders 43 provide bearing surfaces for sliding engagement with complementary angled lower surfaces 24a of the jaw guide 24. The bearing surfaces of the shoulders 43 transmit large gripping forces F downwardly against a conductor retained in the trough 14. The jaw 40 is forwardly biased toward a gripping position adjacent the body first end 16 by a coil spring 32. The coil spring 32 is installed behind the jaw key 42 in the enlarged part 30 of the keyhole-shaped jaw guide 24. A cap 39 is fixed to the gripper body 28 behind the coil spring 32 to maintain the spring in compression. The cap 39 may be glued, welded, frictionally engaged, or retained in place by a setscrew or the like. The lower edge of the cap 39 is defined by a flat that permits movement of the jaw spine 41 beneath the cap while retaining the spring 32 in front of the cap 39.

The jaw guide 24 is disposed at an angle α of between 10° and 20° relative to the conductor trough 14. The conductor trough is generally parallel to and offset from the leg 22 connecting the gripper body 28 to the coupler 20. The gripper surface 44 of the wedge-shaped jaw 40 is disposed at angle α relative to the shoulders 43, spine 41 and key 42. This configuration maintains the gripper surface 44 parallel to the cable trough 14 as the jaw moves diagonally toward the cable trough from the open position to the gripping position as shown in FIG. 6.

FIG. 6 schematically illustrates the relative positions of the single jaw wedge dead end components with the jaw 40 in each of its forward or gripping position and rearward or open position. In its forward position the shoulders 43 of the jaw may separate from their engagement with the jaw guide lower surfaces 24a due to the tapered configuration of the gripper body 28 adjacent the gripper body lower surface 28a. Large bearing surfaces provided by the jaw guide lower surfaces 24a and the jaw shoulders 43 spread the force F transmitted by the jaw 40 to the cable conductor 50 to prevent stress concentrations in the gripper body 28. In the forward (gripping) position, the jaw gripping surface 44 approaches the bottom of the trough 14 to compressively engage the cable 50. As best seen in FIG. 3, the gripping surface 44 of the jaw includes gripping teeth 45 arranged perpendicular to the length of the jaw 40. These teeth are configured to dig into the conductor and prevent relative movement between the jaw 40 and the conductor 50. It should be noted that the cable trough 14 is substantially smooth and devoid of gripping teeth such as those provided on the jaw 40. This allows the jaw 40 and conductor 50 to move together under the tension T of the conductor until the gripping force F develops sufficiently to hold the conductor 50 in the wedge dead end 10 against the tension.

Figure 7:
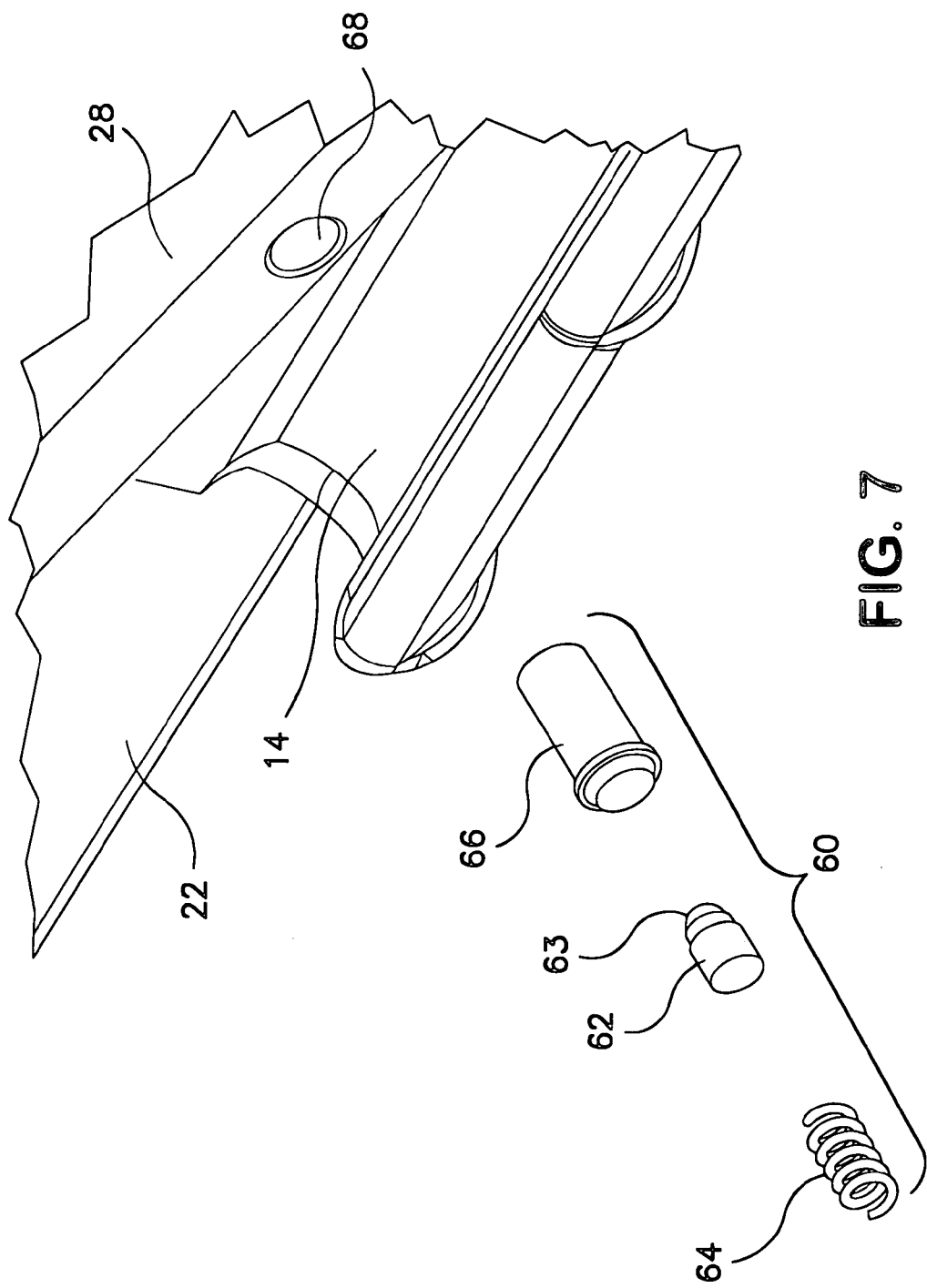
FIG. 7 is an enlarged portion of the pre-assembly view of FIG. 1 showing the components of a spring-loaded latch mechanism according to aspects of the present invention.

An aspect of the single jaw wedge dead end 10 in accordance with the present invention relates to a latch assembly 60 for retaining the jaw 40 in its rearward most (open) position. With reference to FIGS. 1, 3 and 7, the latch assembly 60 includes a cylindrical shell 66, a spring 64 and a latch 62. The latch 62 and spring 64 are assembled into the shell 66 so that a rounded forward end 63 of the latch 62 protrudes from one end of the shell 66. The shell 66 is pressed into a bore 68 defined in the upper lip 27 of the gripper body 28. The installed shell 66 positions the rounded forward end 63 of the spring biased latch 62 to protrude into the narrow part 31 of the jaw guide 24. The jaw spine 41 defines a latch track 49 complementary in shape to the forward end 63 of the latch 62. The track gets shallow at 48 and deepens again to define a seat 47 for the forward end 63 of the latch. The latch 62 is received in the seat 47 when the jaw 40 is pulled back to its open position. The latch 62 retains the jaw in its open position until released by pressure from the rear of the jaw 40 or its handle 46.

When the jaw 40 is latched in its open position the cable trough 14 is open from the side, permitting a conductor 50 to be laid in the trough 14. When the cable conductor 50 is positioned in the trough 14 it does not come in contact with any moving parts of the single jaw wedge dead end 10, reducing the chances that the jaw 40 will be unlatched and released during conductor installation. As previously discussed, unintentional jaw release during conductor positioning may necessitate restarting the procedure. As the cable installation frequently takes place at high elevations on poles or towers, repeating such procedures is awkward and time consuming, potentially increasing the cost of installation. The exemplary latch assembly 60 and latch track 49 securely retain the jaw in its retracted position until released by an installer. The latch and release process may be repeated if necessary.

Figure 5:
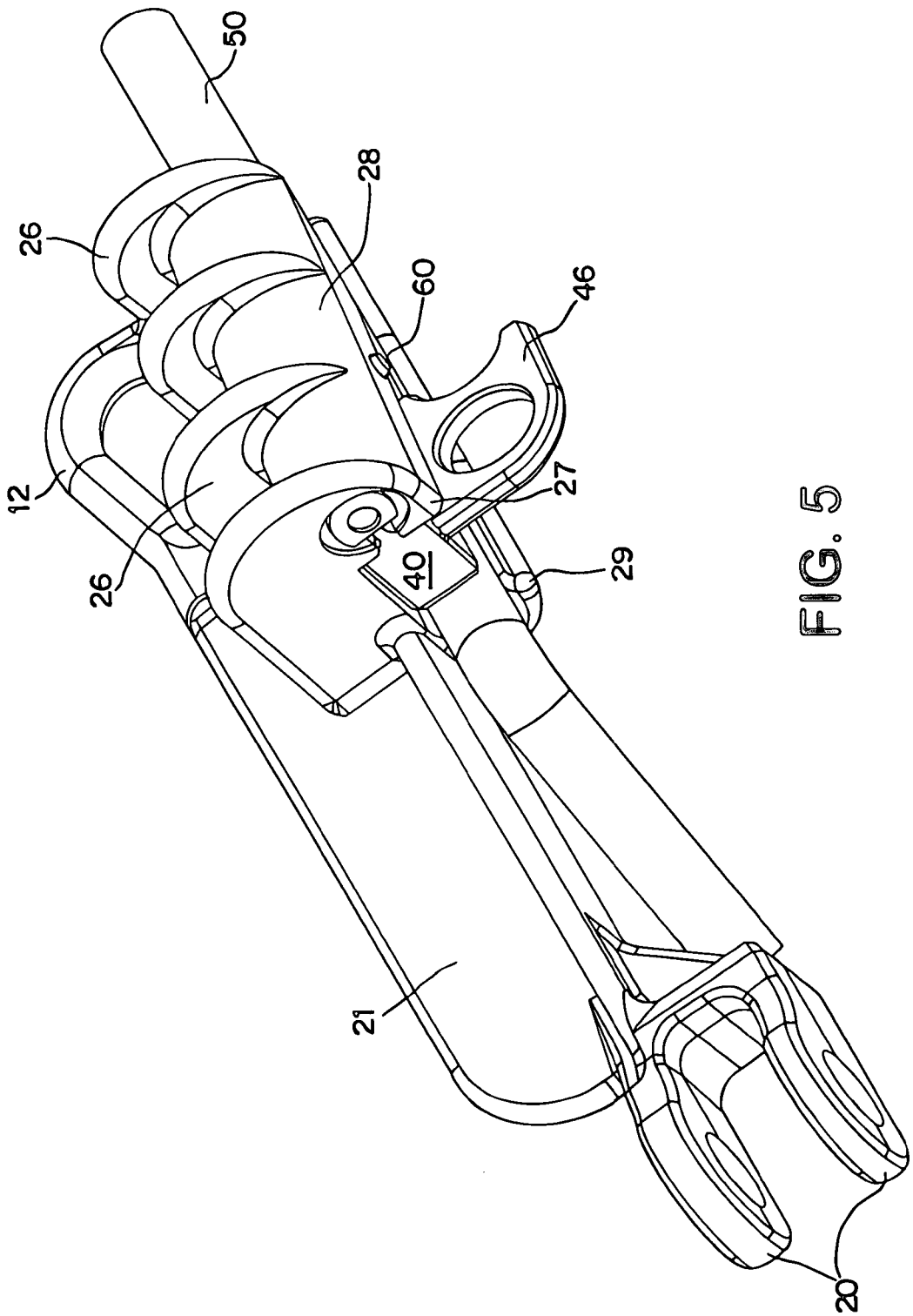
FIG. 5 is a rear perspective view of the dead end/conductor combination of FIG. 2.

FIGS. 2, 5 and 6 illustrate the component relationships that secure a conductor 50 in the gripping mechanism of the single jaw wedge dead end 10. Prior to conductor installation, the single jaw 40 is latched in its rearward (open) position as shown in solid lines (FIG. 6). The conductor 50 is laid into the trough 14 and the jaw 40 is released from its latched position. The jaw 40 moves forwardly (to the right in FIG. 6) into its gripping position (shown in dashed lines in FIG. 6 and also in FIGS. 2 and 5). In the gripping position, the gripping surface 44 of the jaw 40 comes into contact with the outside surface of the conductor 50. The gripping surface 44 includes transverse teeth configured to bite into the outside surface of the conductor to increase the grip of the jaw 40. Because the jaw guide 24 converges with the cable trough 14 toward the first end 16 of the gripper body 28, increasing tension T on the conductor 50 produces an increasing force F by the single jaw 40 compressing the conductor 50 against the cable trough 14. This configuration ultimately results in the full tension of the conductor 50 being developed without the need for an installation technician to tighten hardware or otherwise intervene. The result is a very consistent and reliable conductor gripping apparatus with fewer moving parts and enhanced ease of operation over previously known wedge dead ends.

While exemplary embodiments have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A wedge dead end comprising:
    a coupler for coupling said dead end to a support structure;
    a gripper body defining a fixed longitudinally extending cable trough and a jaw guide disposed at a first angle relative to said cable trough, said jaw guide being closest to said cable trough at a gripper body forward end and diverging from said cable trough toward a gripper body rearward end, said gripper body defining a cable entry slot communicating with a cable space defined between said cable trough and said jaw guide;
    a single wedge-shaped jaw having a guide structure on an upper surface and a longitudinally extending gripping surface on a bottom surface, said guide structure slidably received in said jaw guide and said jaw being movable relative to said body between a forward gripping position and a rearward open position, said jaw biased toward said forward end and said gripping position;
    a latch for releasably retaining said biased jaw in said open position; and
    a leg integrally connecting said coupler to said gripper body rearward end.

2. The wedge dead end of claim 1, wherein said cable trough is defined by a semi-cylindrical surface having a linear axis, said axis being generally parallel to and transversely offset from said leg.

3. The wedge dead end of claim 1, wherein said jaw guide is key-hole shaped, comprising a first portion having a first maximum lateral dimension and a longitudinal slot having a second maximum lateral dimension smaller than said first maximum lateral dimension, said second maximum lateral dimension defined between jaw guide lower shoulders, said guide structure having a key-shape complementary to said jaw guide and said jaw is slidably retained to said gripper body by engagement of said guide structure in said jaw guide.

4. The wedge dead end of claim 3, wherein said first portion is generally cylindrical and said guide structure key-shaped configuration comprises a barrel-shaped portion complementary to said first portion.

5. The wedge dead end of claim 1, wherein said gripping surface is substantially parallel to said cable trough during movement of said jaw relative to said gripper body.

6. The wedge dead end of claim 1, wherein said gripping surface and said upper surface are disposed at a second angle relative to each other, said first and second angles being equal.

7. The wedge dead end of claim 6, wherein said first and second angles are in the range of 10° to 20°.

8. The wedge dead end of claim 3, wherein said jaw upper surface includes a longitudinal upwardly projecting rib slidably engaged between said jaw guide lower shoulders.

9. The wedge dead end of claim 1, wherein said latch comprises:
    a groove in said jaw; and
    a projection from said gripper body slidably received in said groove.

10. The wedge dead end of claim 9, wherein said groove includes a detent and said projection releasably engages said detent to retain said jaw in said open position against said bias.

11. The wedge dead end of claim 1, wherein said gripping surface comprises teeth for gripping a conductor.

12. The wedge dead end of claim 1, wherein said conductor trough has a substantially smooth surface.

13. The wedge dead end of claim 1, wherein said guide structure projects from a forward end of said jaw and said wedge dead end comprises:
    a spring compressed in said jaw guide behind said guide structure to bias said jaw toward said gripping position.

14. A wedge dead end comprising:
    a gripper body defining a linear cable trough and a jaw guide longitudinally extending between forward and rearward ends of said gripper body, said jaw guide and cable trough converging toward said gripper body forward end;
    one wedge-shaped jaw having an upper guide structure engaged with said jaw guide and a lower cable gripping surface disposed generally parallel to said cable trough, said jaw moveable relative to said gripper body between a rearward open position wherein said cable gripping surface is spaced apart from said cable trough to at least partially define a longitudinally open ended cable entry slot and a forward gripping position wherein said cable gripping surface approaches said cable trough so as to come into a wedging engagement against a conductor disposed therebetween, said jaw being spring biased toward said gripping position; and
    a latch for releasably retaining said jaw in said open position against said spring bias.

15. The wedge dead end of claim 14, comprising:
    a leg extending from said gripper body rearward end; and
    a coupling connected to said leg and rearwardly spaced from said gripper body,
    wherein said leg is laterally offset from an axis of said cable trough.

16. The wedge dead end of claim 14, wherein said gripping surface comprises teeth.

17. The wedge dead end of claim 14, wherein said cable trough has a substantially smooth surface.

18. The wedge dead end of claim 14, wherein said jaw includes an upper surface opposed to said cable gripping surface and disposed at a first angle relative thereto and said jaw guide is disposed at a second angle relative to said cable trough, said first angle being equal to said second angle.

19. The wedge dead end of claim 18, wherein said first and second angles are between 10° and 20°.

* * * * *